US012580192B2

(12) United States Patent　　　　　(10) Patent No.: US 12,580,192 B2
Kim et al.　　　　　　　　　　　　　(45) **Date of Patent: *Mar. 17, 2026**

(54) CATHODE ACTIVE MATERIAL PRECURSOR, CATHODE ACTIVE MATERIAL, LITHIUM SECONDARY BATTERY AND METHOD OF MANUFACTURING THE SAME

(71) Applicant: SK ON CO., LTD., Seoul (KR)

(72) Inventors: Jik Soo Kim, Daejeon (KR); Ji Hoon Choi, Daejeon (KR); Kook Hyun Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/233,526

(22) Filed: Jun. 10, 2025

(65) Prior Publication Data

US 2025/0300175 A1　　Sep. 25, 2025

Related U.S. Application Data

(63) Continuation of application No. 17/404,771, filed on Aug. 17, 2021, now Pat. No. 12,334,553.

(30) Foreign Application Priority Data

Aug. 18, 2020　(KR) ........................ 10-2020-0103395

(51) Int. Cl.
　*H01M 4/525*　　(2010.01)
　*H01M 4/04*　　(2006.01)
　　　　　(Continued)

(52) U.S. Cl.
　CPC ......... *H01M 4/525* (2013.01); *H01M 4/0471* (2013.01); *H01M 4/0497* (2013.01); *H01M 4/505* (2013.01); *H01M 10/0525* (2013.01)

(58) Field of Classification Search
　CPC .. H01M 4/525; H01M 4/0471; H01M 4/0497; H01M 4/505; H01M 10/0525; Y02E 60/10
　See application file for complete search history.

(56) References Cited

U.S. PATENT DOCUMENTS 6,306,787 B1 * 10/2001 Sato et al. ............ H01M 4/525
　　　　　　　　　　　　　　　　　　　　　501/94
2003/0087154 A1　5/2003 Ohzuku et al.
　　　　　　(Continued)

FOREIGN PATENT DOCUMENTS

CN　　　103515585 A　　1/2014
CN　　　109761288 A　*　5/2019　............ Y02E 60/10
　　　　　　(Continued)

OTHER PUBLICATIONS

Kase et al., "JP 2015173122 A English Translation", Oct. 1, 2015.*
　　　　　　(Continued)

*Primary Examiner* — Matthew T Martin
*Assistant Examiner* — Alexandra J Simmons
(74) *Attorney, Agent, or Firm* — IP & T GROUP LLP

(57)　　　　ABSTRACT

A cathode active material precursor according to embodiments of the present invention includes a composite hydroxide particle in which primary precursor particles are aggregated. The primary precursor particles include a particle having a triangular shape in which a minimum interior angle is 30° or more and a ratio of a length of a short side relative to a length of a long side is 0.5 or more. A cathode active material and a lithium secondary having improved high temperature stability is provided using the cathode active material precursor.

14 Claims, 6 Drawing Sheets

(51) Int. Cl.
    *H01M 4/505* (2010.01)
    *H01M 10/0525* (2010.01)

(56) References Cited

U.S. PATENT DOCUMENTS

| | | |
|---|---|---|
| 2018/0079655 A1 | 3/2018 | Dai et al. |
| 2018/0159128 A1 | 6/2018 | Kim et al. |

FOREIGN PATENT DOCUMENTS

| | | | | |
|---|---|---|---|---|
| FR | 3063180 A1 | 8/2018 | | |
| JP | H1160246 A | 3/1999 | | |
| JP | 2015173122 A | * 10/2015 | ............ | Y02E 60/10 |
| KR | 20110033375 A | 3/2011 | | |

OTHER PUBLICATIONS

Zhang et al., CN109761288A English Translation, Oct. 23, 2001.*
First Office Action on the Chinese Patent Application No. 202110948308.9 issued by the Chinese Patent Office on Sep. 30, 2023.

* cited by examiner

S(short side)

S/L ≥ 0.5, α ≥ 30°

L(long side)

CATHODE ACTIVE MATERIAL PRECURSOR, CATHODE ACTIVE MATERIAL, LITHIUM SECONDARY BATTERY AND METHOD OF MANUFACTURING THE SAME

CROSS-REFERENCE TO RELATED APPLICATION AND CLAIM OF PRIORITY

This application is a continuation of U.S. patent application Ser. No. 17/404,771 filed on Aug. 17, 2021, which claims priority to Korean Patent Application No. 10-2020-0103395 filed on Aug. 18, 2020, in the Korean Intellectual Property Office (KIPO), the entire disclosure of which is incorporated by reference herein.

BACKGROUND

1. Field

The present invention relates to a cathode active material precursor, a cathode active material, a lithium secondary battery and methods of manufacturing the same. More particularly, the present invention relates to a cathode active material precursor including a plurality of metal elements, a cathode active material, a lithium secondary battery and methods of manufacturing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as an active material for a cathode of the lithium secondary battery. For example, the lithium metal oxide may include a nickel-based lithium metal oxide. A nickel-containing precursor compound may be used to prepare the nickel-based lithium metal oxide.

Recently, as an application range of the lithium secondary battery has been expanded from a small electronic device to a large scaled device such as a hybrid vehicle, a content of nickel is increasing to achieve sufficient capacity and power. However, as the content of nickel increases, reliability of the cathode active material may be deteriorated due to mismatch and side reaction with lithium.

For example, Korean Registered Patent Publication No. 10-0821523 discloses a method for manufacturing a cathode active material using a lithium composite metal oxide, but still possess the problem of a high nickel-based cathode active material.

SUMMARY

According to an aspect of the present invention, there is provided a cathode active material precursor having improved stability.

According to an aspect of the present invention, there is provided a cathode active material having improved stability.

According to an aspect of the present invention, there is provided a lithium secondary battery having improved stability.

According to an aspect of the present invention, there is provided a method of manufacturing a cathode active material precursor having improved stability.

According to an aspect of the present invention, there is provided a method of manufacturing a cathode active material for a lithium secondary battery having improved stability.

According to exemplary embodiments of the present invention, a cathode active material precursor includes a composite hydroxide particle in which primary precursor particles are aggregated. The primary precursor particles include a particle having a triangular shape in which a minimum interior angle is 30° or more and a ratio of a length of a short side relative to a length of a long side is 0.5 or more.

In some embodiments, the composite hydroxide particle may contain an excess of nickel among metals included therein and has a specific surface area of 1.5 $m^2/g$ or less.

In some embodiments, the composite hydroxide particle may have a specific surface area of 1 $m^2/g$ or less.

In some embodiments, a molar ratio of nickel in the metals included in the composite hydroxide particle may be 0.8 or more.

In some embodiments, the composite hydroxide particle may further include cobalt.

In some embodiments, the composite hydroxide particle may further include manganese.

In some embodiments, the composite hydroxide particle may be represented by Chemical Formula 1:

$$Ni_\alpha Co_\beta M_\gamma (OH)_z \qquad \text{Chemical Formula 1}$$

In Chemical Formula 1, M includes at least one selected from the group consisting of Mg, Sr, Ba, B, Al, Si, Mn, Ti, Zr and W, $0.8 \le \alpha \le 0.95$, $0 \le y/(\alpha+\beta) \le 0.13$, $0 \le \gamma \le 0.11$ and $1.9 \le z \le 2.1$.

In some embodiments, the ratio of the length of the short side relative to the length of the long side may be 0.8 or more.

According to exemplary embodiments of the present invention, a cathode active material for a secondary battery includes a lithium composite oxide particle formed from the cathode active material precursor as described above.

In some embodiments, the lithium composite oxide particle may have an amorphous shape.

According to exemplary embodiments of the present invention, a lithium secondary battery includes a cathode including the cathode active material as described above, and an anode facing the cathode.

In a method of manufacturing a cathode active material precursor, a reaction solution containing a metal source is prepared. A co-precipitate is formed through a co-precipitation reaction in the reaction solution. A solid content in the reaction solution is 50 wt % or more after the co-precipitation reaction. A composite hydroxide particle is formed in which primary precursor particles are aggregated by the co-precipitation reaction, and the primary precursor particles include a particle having a triangular shape in which a minimum interior angle is 30° or more and a ratio of a length of a short side relative to a length of a long side is 0.5 or more.

In some embodiments, the co-precipitation reaction may be performed under a condition in which a pH value is changed from 11.8 or more to 10.8 or less. In some embodiments, the co-precipitation reaction is performed for 120 hours or more.

In a method of manufacturing a cathode active material for a secondary battery, the cathode active material precursor as described above is prepared. A preliminary lithium composite oxide particle is formed by reacting the cathode active material precursor with a lithium source. The preliminary lithium composite oxide particle is post-treated.

In some embodiments, the preliminary lithium composite oxide particle may have a specific surface area of $0.12 \text{ m}^2/\text{g}$ or less.

In some embodiments, the post-treating may include at least one of coating, heat-treating, washing and drying.

In some embodiments, in the formation of the preliminary lithium composite oxide particle, firing may be performed after reacting the cathode active material precursor with the lithium source.

According to exemplary embodiments, a cathode active material precursor may include a composite hydroxide particle formed by an aggregation of primary precursor particles including a particle having a specific triangular shape.

For example, a specific surface area of the primary precursor particles may be decreased and a contact area between the primary precursor particles may be increased due to the specific triangular shape thereof. Accordingly, the specific surface area of the cathode active material formed from the composite hydroxide particles may be reduced, structural stability may be improved, and high temperature life-span and storage properties may be improved.

DETAILED DESCRIPTION OF THE EMBODIMENTS

Figure 1:
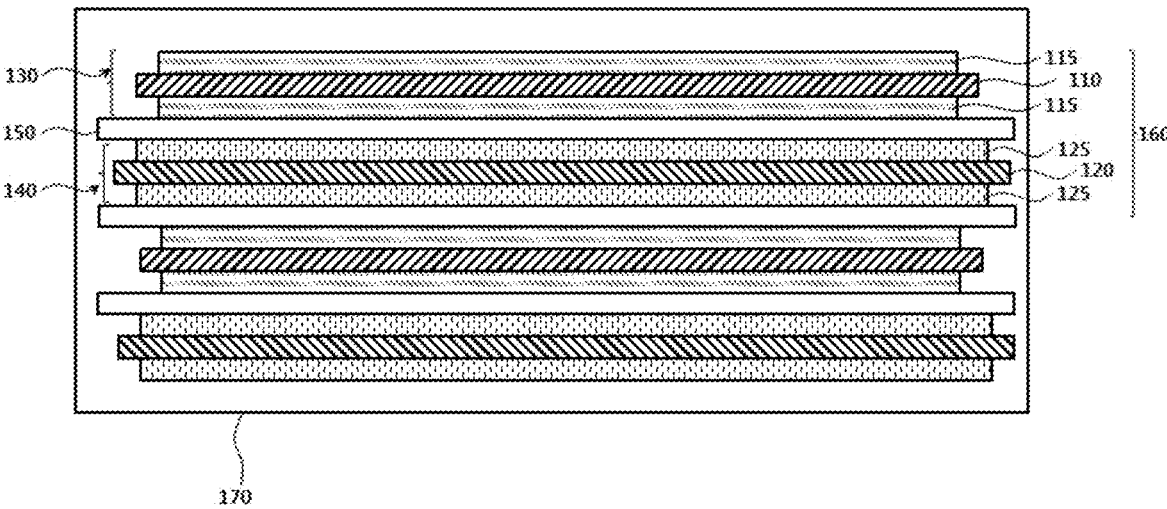
FIG. 1 is a schematic cross-sectional view illustrating a lithium secondary battery in accordance with exemplary embodiments exemplary embodiments.

According to exemplary embodiments of the present invention, there is provided a cathode active material precursor including a composite hydroxide particle formed from an assembly of primary precursor particles having a specific shape, a cathode active material formed from the same, and a lithium secondary battery including the cathode active material.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The cathode active material precursor may include a composite hydroxide particles in the form of a secondary particle in which a plurality of primary precursor particles are aggregated or assembled.

The primary precursor particle may include a particle having a triangular shape in which the smallest interior angle is 30° or more and a ratio (that may be referred to as an aspect ratio) of a length of a short side relative to a length of a long side is 0.5 or more. The long side may mean the longest side among three sides of a triangle, and the short side may mean the shortest side among three sides of a triangle.

In some embodiments, at least one or at least two of the inner angles of the primary precursor particle may be from 30° to 60°. In some embodiments, the smallest interior angle of the primary precursor particle may be from 30° to 60°.

The composite hydroxide particle formed from the primary precursor particle that may include a particle having the triangular shape may have enhanced high-temperature stability when being converted into a lithium composite oxide by firing. Further, high-temperature life-span and storage properties of a lithium secondary battery using the lithium composite oxide as a cathode active material may be improved.

A maximum value of the aspect ratio may be 1. If the aspect ratio is less than 0.5, a specific surface area of the composite hydroxide particle formed by aggregation of the primary precursor particles may excessively increase, and a contact area between the primary precursor particles may be reduced. In this case, the high-temperature stability of the cathode active material formed from the composite hydroxide particles may be degraded.

In a preferable embodiment, the aspect ratio in the triangular shape may be 0.8 or more.

For example, the triangular shape may be a shape of one surface of the primary precursor particle. For example, the shape of the primary precursor particle may include a triangular plate, a triangular prism, a triangular cylinder, a tetrahedron, or the like.

For example, the term "the triangular shape" used herein may include a shape in which two of three sides are in contact with each other to form a vertex, and may also include two virtual extended sides extending within about 20% of each side are in contact with each other to form a virtual vertex.

For example, one surface of the primary precursor particles may have a triangular shape to have a large surface area, and may contact a triangular-shaped surface of another primary precursor particle. In this case, an interfacial area at which the particles are in contact with each other in a stack or overlap of the primary precursor particles may be increased. Thus, structural stability of the composite hydroxide particle formed as the secondary particle may be improved.

For example, the composite hydroxide particle may be a substance of a cation component and a counter ion component. The cation component may include, e.g., a metal ion. The counter ion component may include a hydroxide ion (OH⁻), or the like. For example, the composite hydroxide particle may be a composite hydroxide including two or more metal elements.

In some embodiments, the composite hydroxide particle may include an excess amount of nickel among metals.

The term "excess amount" used herein may indicate the largest mole fraction or molar ratio among a plurality of components. Specifically, the term "excess amount" may indicate more than 50 mol % based on total moles of metals included in the composite hydroxide particle.

In some embodiments, the composite hydroxide particle may further include cobalt and/or manganese. For example, the composite hydroxide particle may include a nickel-cobalt-based precursor, a nickel-manganese-based precursor or a nickel-cobalt-manganese (NCM)-based precursor.

In exemplary embodiments, the composite hydroxide particle may be represented by Chemical Formula 1 below.

$$Ni_\alpha Co_\beta M_\gamma (OH)_z \qquad \text{Chemical Formula 1}$$

In Chemical Formula 1, $0.8 \leq \alpha \leq 0.95$, $0 \leq \gamma/(\alpha+\beta) \leq 0.13$, $0 \leq \delta \leq 0.11$, and $1.9 \leq z \leq 2.1$. M may represent a dopant or a transition metal. M may include, e.g., at least one of Mg, Sr, Ba, B, Al, Si, Mn, Ti, Zr and W.

In an embodiment, a content or a molar ratio of Co may be greater than that of M. Accordingly, a resistance of the cathode electrode active material may be decreased to increase conductivity. M as a dopant may further improve long-term stability and high-temperature stability of the cathode active material.

In exemplary embodiments, a specific surface area of the composite hydroxide particle may be 1.5 m²/g or less. If the specific surface area is more than 1.5 m²/g, a specific surface area of the lithium composite oxide particle prepared from the composite hydroxide particle may be excessively increased. In this case, a surface structure of the cathode active material may become unstable under a high temperature condition. Preferably, the specific surface area of the composite hydroxide particle may be 1 m²/g or less. In an embodiment, the specific surface area of the composite hydroxide particle may be 0.2 m²/g or more or 0.4 m²/g or more.

The composite hydroxide particle may be prepared through a co-precipitation reaction of metal salts (metal sources). The metal salts may include a nickel salt, a cobalt salt and/or a manganese salt.

Examples of the nickel salt include nickel sulfate, nickel hydroxide, nickel nitrate, nickel acetate, and hydrates thereof. Examples of the cobalt salt include cobalt sulfate, cobalt nitrate, cobalt carbonate, and hydrates thereof. Examples of the manganese salt include manganese sulfate, manganese acetate, and hydrates thereof.

The metal salts may be mixed with a precipitating agent and/or a chelating agent at a ratio satisfying the content or concentration ratio of each metal described with reference to Chemical Formula 1 to form an aqueous solution. The aqueous solution may be co-precipitated in a reactor to prepare the composite hydroxide particle.

The precipitating agent may include an alkaline compound such as sodium hydroxide (NaOH), sodium carbonate (Na₂CO₃), or the like. The chelating agent may include, e.g., aqueous ammonia (e.g., NH₃H₂O), ammonium carbonate (e.g., NH₃HCO₃), or the like.

In exemplary embodiments, a reaction solution in which the co-precipitation reaction occurs may include a metal source and a co-precipitate. During the co-precipitation reaction, a solid content in the reaction solution may be maintained as about 50 weight percent (wt %) or more. For example, a total weight ratio of the co-precipitate may be about 50 wt % or more of the reaction solution. If the solid content in the reaction solution is less than 50 wt %, a conventional needle-shaped precursor may be formed. In exemplary embodiments, if the solid content in the reaction solution is 50 wt % or more, the primary precursor particle having the triangular shape may be more easily formed.

A temperature of the co-precipitation reaction may be controlled in, e.g., a range from about 40° C. to 60° C. A reaction time may be at least about 120 hours.

If the co-precipitation reaction time is 120 hours or more, the solid content in the reaction solution after completion of the co-precipitation reaction may be 50 wt % or more. In this case, the primary precursor particles having the triangular shape may be effectively formed.

In exemplary embodiments, the co-precipitation reaction may be performed under a condition in which pH may be changed from 11.8 or more to 10.8 or less. The triangular-shaped primary precursor particles may be effectively formed under the pH change condition.

In some embodiments, the co-precipitation reaction may be performed at an oxygen concentration of 0.1% or less. If the oxygen concentration is beyond the above range, a shape of the resulting composite hydroxide particle may become a needle-like shape and a specific surface area thereof may increase.

In exemplary embodiments, the primary precursor particle may be dried at about 80° C. to 160° C. In this case, a plurality of the primary precursor particles may be aggregated to form the composite hydroxide particle in the form of the secondary particle. The primary precursor particles may be washed with an alkaline aqueous solution and/or water before being dried.

In example embodiments, the lithium composite oxide particle (the cathode active material) may be prepared by mixing and reacting the composite hydroxide particle and a lithium source. The lithium source may include, e.g., a lithium salt such as lithium carbonate, lithium nitrate, lithium acetate, lithium oxide, lithium hydroxide, etc. These may be used alone or in a combination thereof.

In exemplary embodiments, the reaction between the composite hydroxide particle and the lithium source may include a heat treatment (a first firing). For example, in an embodiment, a temperature of the heat treatment may be in a range from about 600° C. to 1000° C.

In exemplary embodiments, a specific surface area of a preliminary lithium composite oxide particle formed by the first firing may be 0.12 m²/g or less. When the cathode active material is formed through the preliminary lithium composite oxide particles having the specific surface area of 0.12 m²/g or less, high temperature stability may be further improved.

In some embodiments, the specific surface area of the preliminary lithium composite oxide particles may be 0.06 m²/or more. When the specific surface area is less than 0.06 m²/g, movement and transport of lithium ions may be restricted and power and capacity of the secondary battery may be degraded.

The preliminary lithium composite oxide particle may be subjected to a post-treatment process such as a coating, an additional heat treatment (a second firing), a washing and a drying to form the cathode active material.

For example, lithium impurities or unreacted water-soluble impurities may be removed by the washing, and the additional heat treatment (the second firing) process may fix metal elements and increase crystallinity. In some embodiments, the second firing may be performed during the coating.

The lithium composite oxide particle may include an oxide including lithium and other elements such as a transition metal.

The lithium composite oxide particle may include nickel. Nickel may be included in an excess amount relatively to other elements except for lithium and oxygen of the lithium composite oxide particle.

Nickel may serve as a metal associated with the capacity of the lithium secondary battery. In exemplary embodiments, nickel may be included in the excess amount relatively to other elements except for lithium and oxygen of the lithium composite oxide particle to remarkably improve the capacity of the secondary battery.

In exemplary embodiments, a molar ratio of nickel among elements other than lithium and oxygen of the lithium composite oxide particle may be 0.8 or more.

In some embodiments, the lithium composite oxide particle may be a nickel-cobalt-based lithium composite oxide further containing cobalt. In some embodiments, the lithium composite oxide particle may be a nickel-cobalt-manganese (NCM)-based lithium composite oxide further including cobalt and manganese.

In exemplary embodiments, the lithium composite oxide particle may be represented by Chemical Formula 2 below.

$$Li_xNi_aCo_bM_cO_y \qquad \text{Chemical Formula 2}$$

In Chemical Formula 2, M is at least one of Al, Zr, Ti, B, Mg, Mn, Ba, Si, W, and Sr, $0.9 \le x \le 1.1$, $1.9 \le y \le 2.1$, $0.8 \le a \le 0.95$, $0 \le c/(a+b) \le 0.13$, and $0 \le c \le 0.11$.

For example, as a content of nickel increases, the capacity and power of the lithium secondary battery may be improved. However, if the content of nickel is excessively increased, life-span, and mechanical and electrical stability of the battery may be degraded. For example, if the content of nickel is excessively increased, defects such as ignition and short circuit caused when a penetration by an external object occurs may not be sufficiently suppressed. Accordingly, according to exemplary embodiments, manganese (Mn) may also be distributed throughout the particles to reduce or prevent chemical and mechanical instability caused by nickel.

Manganese (Mn) may serve as a metal related to mechanical and electrical stability of a lithium secondary battery. For example, manganese may suppress or reduce defects such as ignition and short circuit that may occur when the cathode is penetrated by the external object, and may enhance the life-span of the lithium secondary battery. Cobalt (Co) may be a metal related to conductivity or resistance of the lithium secondary battery.

If the molar ratio of Ni is less than 0.8, capacity and power may be reduced. If the molar ratio of Ni exceeds 0.95, life-span or mechanical stability of the battery may be deteriorated.

In some embodiments, in Chemical Formula 2, $0.05 \le b \le 0.2$, $0.03 \le c \le 0.11$ and $0.95 < a+b+c \le 1.1$. In the above composition range, a balanced power, capacity, life-span and stability of the lithium composite oxide particle may be achieved.

In exemplary embodiments, the lithium composite oxide particle may have a secondary particle structure formed by aggregation of primary particles.

An average particle diameter ($D_{50}$) of the primary particle in a volume-based cumulative distribution of a particle size may be in, e.g., a range from about 0.5 μm to 1.2 μm. An average particle diameter ($D_{50}$) of the secondary particle in a volume-based cumulative distribution of a particle size may be in, e.g., a range from about 9 μm to 12 μm. In the above particle size range, cohesive and bonding force between the primary particles may be improved, and high temperature stability may also be improved.

In a comparative example, a lithium composite oxide particles formed from a conventional needle-shaped precursor particle has an angular surface shape of a quadrangle or more such as a crystal form of a rectangular plate having an octahedron or hexahedron structure, a rectangular column, a hexahedral or octahedral structure, etc.

In exemplary embodiments, the lithium composite oxide particle may have an amorphous shape substantially having no corner angle, and the lithium composite oxide particle may not have a specific crystal shape and may not have an angular shape of a polyhedron including a surface of a quadrangle, a pentagon or more.

FIG. 1 is a schematic cross-sectional view illustrating a lithium secondary battery in accordance with exemplary embodiments exemplary embodiments.

Referring to FIG. 1, the lithium secondary battery may include a cathode 130, an anode 140 and a separation layer 150 interposed between the cathode and the anode.

The cathode 130 may include a cathode current collector 110 and a cathode active material layer 115 formed by coating a cathode active material on the cathode current collector 110.

A cathode slurry may be prepared by mixing and stirring the cathode active material in a solvent with a binder, a conductive agent and/or a dispersive agent. The cathode slurry may be coated on the cathode current collector 110, and then dried and pressed to form the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive agent may be added to facilitate electron mobility between active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, the anode 140 may include an anode current collector 120 and an anode active material layer 125 formed by coating an anode active material on the anode current collector 120.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 120 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive agent and/or a dispersive agent in a solvent. The slurry may be coated on the anode current collector 120, and then dried and pressed to form the anode 140.

The binder and the conductive agent substantially the same as or similar to those mentioned above may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may also include a non-woven fabric formed from a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without a loss by, e.g., precipitation or sedimentation. Thus, improvement of power and stability may be efficiently realized through a combination with the above-described composite hydroxide particle or the cathode active material.

In exemplary embodiments, an electrode cell may be defined by the cathode 130, the anode 140 and the separation layer 150, and a plurality of the electrode cells may be stacked to form an electrode assembly that may have e.g., a jelly roll shape. For example, the electrode assembly may be formed by winding, laminating or folding the separation layer 150.

The electrode assembly may be accommodated together with an electrolyte in an outer case 170 to define a lithium secondary battery. In exemplary embodiments, a non-aqueous electrolyte may be used as the electrolyte.

For example, the non-aqueous electrolyte solution may include a lithium salt and an organic solvent. The lithium salt commonly used in the electrolyte for the lithium secondary battery may be used, and may be represented by $Li+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

Electrode tabs may protrude from the cathode current collector 110 and the anode electrode current collector 120 included in each electrode cell to one side of the outer case 170. The electrode tabs may be welded together with the one side of the outer case 170 to form an electrode lead extending or exposed to an outside of the outer case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Composite Hydroxide Particle 5 m³ of water was put into a sealed co-precipitation reactor equipped with a stirrer and a concentrator and having a volume of 5.5 m³, and then nitrogen gas was bubbled for at least 4 hours to remove internal dissolved oxygen while maintaining an internal temperature at 63° C. 15.1 kg of NaOH was added to the reactor, and 28% aqueous ammonia was added to the reactor to adjust a concentration of $NH_3$ to 24 g/L. A pH of the obtained reaction solution was 11.9.

While initially stirring the reaction solution at 175 rpm, $NiSO_4 \cdot 6H_2O$, $CoSO_4 \cdot 7H_2O$ and $MnSO_4 \cdot H_2O$ were used to prepare a 2.0M metal mixed aqueous solution with a molar ratio of Ni:Co:Mn=0.8:0.1:0.1. 2.2 M NaOH solution as a pH control agent and 4.5 M ammonia solution as a chelating agent were continuously added while bubbling $N_2$ to proceed with a co-precipitation reaction.

A residual liquid was continuously discharged to an outside of the reactor by the concentrator during the reaction, and the reaction proceeded for 157 hours while solid contents remained in the reactor.

The initial pH of 11.9 and the stirring rate of 175 rpm were gradually reduced to 10.4 and of 141 rpm, respectively, until the reaction was completed to prevent a generation of new fine particles due to the increase of the solid contents as the reaction proceeded.

The solids content in the final reactor was 69.6 wt %. A mother liquor after the reaction completed was washed sequentially using 2.2M NaOH solution and pure water, filtered and then dried at 120° C. for 12 hours to obtain 6.5 tons of $Ni_{0.8}Co_{0.1}Mn_{0.1}(OH)_2$ as a high-density metal composite hydroxide (a precursor A) which had an average particle size ($D_{50}$) 12.1 μm, a tap density 2.17 g/cc, a BET 0.89 m²/g.

(2) Preparation of Preliminary Lithium Composite Oxide Particle 1 kg of the precursor A and lithium hydroxide (LiOH·H₂O) were mixed in a high-speed mixer at a Li/M molar ratio of 1.06, and a temperature was raised to 760° C. at an temperature increase rate of 2.5° C./min in a Noritake kiln (RHK Simulator) to be maintained at 760° C. for 10 hours. Oxygen was passed continuously at a flow rate of 40 mL/min during raising and maintaining the temperature.

After sintering, natural cooling was performed to room temperature, pulverization and classification were performed to obtain preliminary lithium composite oxide particles.

(3) Post-treatment 200 g of the preliminary lithium composite oxide particles were dry-coated by 0.5 wt %, 0.2 wt %, and 0.1 wt % of each $Al_2O_3$, $TiO_2$ and $ZrO_2$ having a nano-scale particle size through a high-speed coater, and then annealed in a box-type kiln at 700° C. and with an oxygen flow rate of 5 ml/min for 6 hours. The dry-coated and heat-treated lithium composite oxide particles were stirred with pure water in a 1:1 weight ratio for 20 minutes and filtered under reduced pressure using a Buchner funnel. The filtered lithium metal composite oxide particles were dried under vacuum at 250° C. for 24 hours and classified using 325 mesh to finally obtain a cathode active material $LiNi_{0.8}Co_{0.1}Mn_{0.1}O_2$ as a nickel-based lithium metal composite oxide.

Example 2

The same procedure as that in Example 1 was performed except that the Li/M ratio was set to 1.08 in the preparation of the preliminary lithium composite oxide particles.

Example 3

The same procedure as that in Example 1 was performed except that the firing temperature was set to 775° C. in the preparation of the preliminary lithium composite oxide particles.

Example 4

The same procedure as that in Example 3 was performed except that the Li/M ratio was set to 1.08 in the preparation of the preliminary lithium composite oxide particles.

Example 5

The same procedure as that in Example 1 was performed except that the firing temperature was set to 790° C. in the preparation of the preliminary lithium composite oxide particles.

Example 6

The same procedure as in Example 5 was performed except that the Li/M ratio was set to 1.08 in the preliminary lithium composite oxide particle manufacturing process.

Example 7

From the procedure of Example 3, the preparation of the preliminary lithium composite oxide particles and the post-treatment were performed as follows:
1) Preparation of Preliminary Lithium Composite Oxide Particle
25 kg of the precursor A and lithium hydroxide ($LiOH\cdot H_2O$) were mixed in a high-speed mixer at a Li/M molar ratio of 1.06, and then filled in a ceramic crucible (Codilite Sagger) by 6.5 kg.
The temperature was raised to 775° C. at a temperature increasing rate of 2.5° C./min in a continuous sealed atmosphere firing furnace (RHK, Roller Hearth Kiln), and a first firing was performed under the condition that the temperature was maintained at 775° C. for 10 hours.

An oxygen concentration in the maintaining period in the kiln was 93% or more. A discharged cake was pulverized and classified to obtain preliminary lithium composite oxide particles.
2) Post-treatment Process
25 kg of the preliminary lithium composite oxide particles were dry-coated by 0.5 wt %, 0.2 wt % and 0.1 wt % of each $Al_2O_3$, $TiO_2$ and $ZrO_2$ having a nano-scale particle size through a high-speed coater, and then annealed in a continuous kiln (RHK) at 700° C. and with an oxygen flowing condition. The dry-coated and heat-treated lithium composite oxide particles were stirred with pure water in a 1:1 weight ratio for 20 minutes and filtered using a filter press. The filtered lithium metal composite oxide was dried under vacuum at 250° C. for 24 hours using a rotary vacuum dryer, and classified using 325 mesh to finally obtain a cathode active material $LiNi_{0.8}Co_{0.1}Mn_{0.1}O_2$ which was a nickel-based lithium metal composite oxide.

Comparative Example 1

5 m³ of water was put into a sealed co-precipitation reactor equipped with a stirrer and a concentrator and having a volume of 5.5 m³, and then nitrogen gas was bubbled for at least 4 hours to remove internal dissolved oxygen while maintaining an internal temperature at 63° C. 12.1 kg of NaOH was added to the reactor, and 28% aqueous ammonia was added to the reactor to adjust a concentration of $NH_3$ to 24 g/L. A pH of the obtained reaction solution was 11.6.

While initially stirring the reaction solution at 175 rpm, $NiSO_4\cdot 6H_2O$, $CoSO_4\cdot 7H_2O$ and $MnSO_4\cdot H_2O$ were used to prepare a 2.0M metal mixed aqueous solution with a molar ratio of Ni:Co:Mn=0.8:0.1:0.1. 2.2 M NaOH solution as a pH control agent and 4.5 M ammonia solution as a chelating agent were continuously added while bubbling $N_2$ to proceed with a co-precipitation reaction.

A residual liquid was continuously discharged to an outside of the reactor by the concentrator during the reaction, and the reaction proceeded for 77 hours while solid contents remained in the reactor.

The initial pH of 11.6 and the stirring rate of 175 rpm were gradually reduced to 10.08 and of 135 rpm, respectively, until the reaction was completed to prevent a generation of new fine particles due to the increase of the solid contents as the reaction proceeded.

The solids content in the final reactor was 37.2 wt %. A mother liquor after the reaction completed was washed sequentially using 2.2M NaOH solution and pure water, filtered and then dried at 120° C. for 12 hours to obtain 3.3 tons of $Ni_{0.8}Co_{0.1}Mn_{0.1}(OH)_2$ as a high-density metal composite hydroxide (a precursor C) which had an average particle size ($D_{50}$) 13.7 μm, a tap density 2.03 g/cc, a BET 9.80 m²/g.

Processes the same as that in Example 1 for preparing the preliminary lithium composite oxide particle and the post-treatment were performed except that the precursor C was used.

Comparative Example 2

The same procedure as that in Comparative Example 1 was performed except that the Li/M ratio was set to 1.08 in the preparation of the preliminary lithium composite oxide particle.

Comparative Example 3

From the procedure of Comparative Example 2, the preparation of the preliminary lithium composite oxide particles and the post-treatment were performed as follows:

1) Preparation of Preliminary Lithium Composite Oxide Particle 25 kg of the precursor C and lithium hydroxide (LiOH·H₂O) were mixed in a high-speed mixer at a Li/M molar ratio of 1.08, and then filled in a ceramic crucible (Codilite Sagger) by 6.5 kg.

The temperature was raised to 760° C. at a temperature increasing rate of 2.5° C./min in a continuous sealed atmosphere firing furnace (RHK, Roller Hearth Kiln), and a first firing was performed under the condition that the temperature was maintained at 760° C. for 10 hours.

An oxygen concentration in the maintaining period in the kiln was 93% or more. A discharged cake was pulverized and classified to obtain preliminary lithium composite oxide particles.

2) Post-treatment Process

The preliminary lithium composite oxide particle obtained above was post-treated by the method the same as that in Example 7 to obtain a cathode active material LiNi₀.₈Co₀.₁Mn₀.₁O₂ which was a nickel-based lithium metal composite oxide.

Comparative Example 4

5 m³ of water was put into a sealed co-precipitation reactor equipped with a stirrer and a concentrator and having a volume of 5.5 m³, and then nitrogen gas was bubbled for at least 4 hours to remove internal dissolved oxygen while maintaining an internal temperature at 63° C. 13.5 kg of NaOH was added to the reactor, and 28% aqueous ammonia was added to the reactor to adjust a concentration of NH₃ to 24 g/L. A pH of the obtained reaction solution was 11.75.

While initially stirring the reaction solution at 175 rpm, NiSO₄·6H₂O, CoSO₄·7H₂O and MnSO₄·H₂O were used to prepare a 2.0M metal mixed aqueous solution with a molar ratio of Ni:Co:Mn=0.8:0.1:0.1. 2.2 M NaOH solution as a pH control agent and 4.5 M ammonia solution as a chelating agent were continuously added while bubbling N₂ to proceed with a co-precipitation reaction.

A residual liquid was continuously discharged to an outside of the reactor by the concentrator during the reaction, and the reaction proceeded for 90 hours while solid contents remained in the reactor.

The initial pH of 11.75 and the stirring rate of 175 rpm were gradually reduced to 10.21 and of 130 rpm, respectively, until the reaction was completed to prevent a generation of new fine particles due to the increase of the solid contents as the reaction proceeded.

The solids content in the final reactor was 43.0 wt %. A mother liquor after the reaction completed was washed sequentially using 2.2M NaOH solution and pure water, filtered and then dried at 120° C. for 12 hours to obtain 4 tons of Ni₀.₈Co₀.₁Mn₀.₁(OH)₂ as a high-density metal composite hydroxide (a precursor B) which had an average particle size (D₅₀) 13.3 μm, a tap density 2.06 g/cc, a BET 6.81 m²/g.

Processes the same as that in Example 1 for preparing the preliminary lithium composite oxide particle and the post-treatment were performed except that the precursor B was used.

Comparative Example 5

The same procedure as that in Comparative Example 3 was performed except that the temperature was set to 775°

C. in preparation of the preliminary lithium composite oxide particle while using the precursor B.

Comparative Example 6

The same procedure as that in Comparative Example 3 was performed except that the temperature was set to 790° C. in preparation of the preliminary lithium composite oxide particle while using the precursor B.

Experimental Example 1

(1) Analysis on Surface Structure

Surface images of the composite hydroxide particles according to Examples and Comparative Examples were obtained using a scanning electron microscope (SEM).

Figure 2:
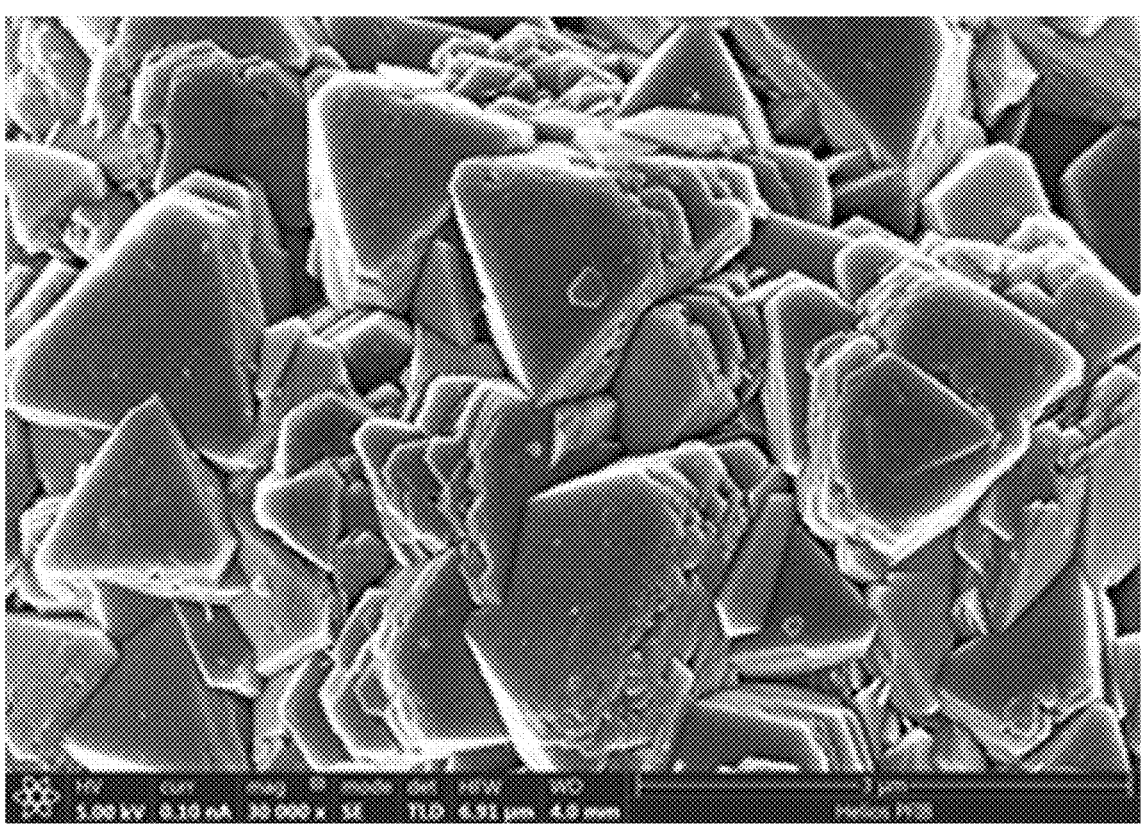
FIG. 2 is an SEM image of a precursor particle (a composite hydroxide particle) for a cathode active material according to exemplary embodiments.

FIG. 2 is an SEM image of a precursor particle (a composite hydroxide particle) for a cathode active material according to exemplary embodiments.

Referring to FIG. 2, it was confirmed that the composite hydroxide particles according to Example 1 had a secondary particle structure in which primary particles were aggregated. Further, a surface shape of the primary particle was approximately triangular, and a length ratio (the aspect ratio) of a short side to a long side of the triangle was 0.5 or more.

Figure 3:
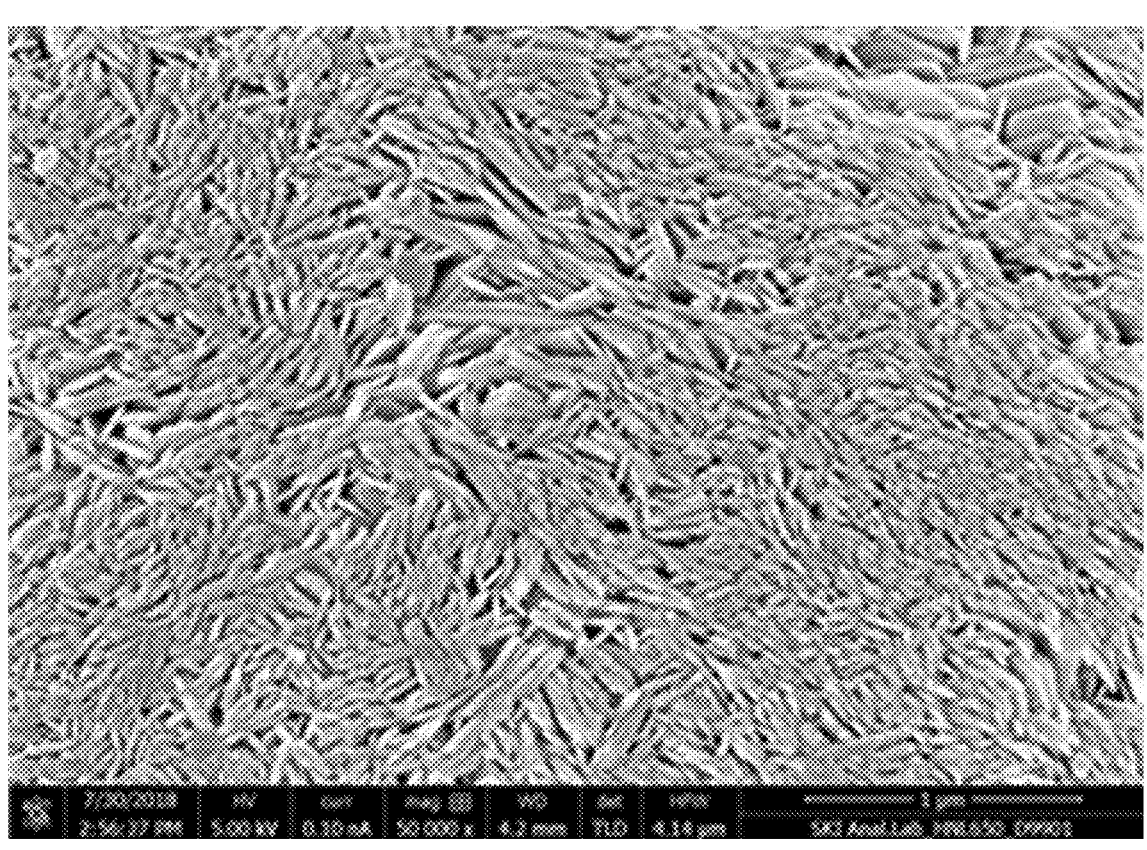
FIG. 3 is an SEM image of composite hydroxide particles used in Comparative Examples 1 to 3.
Figure 4:
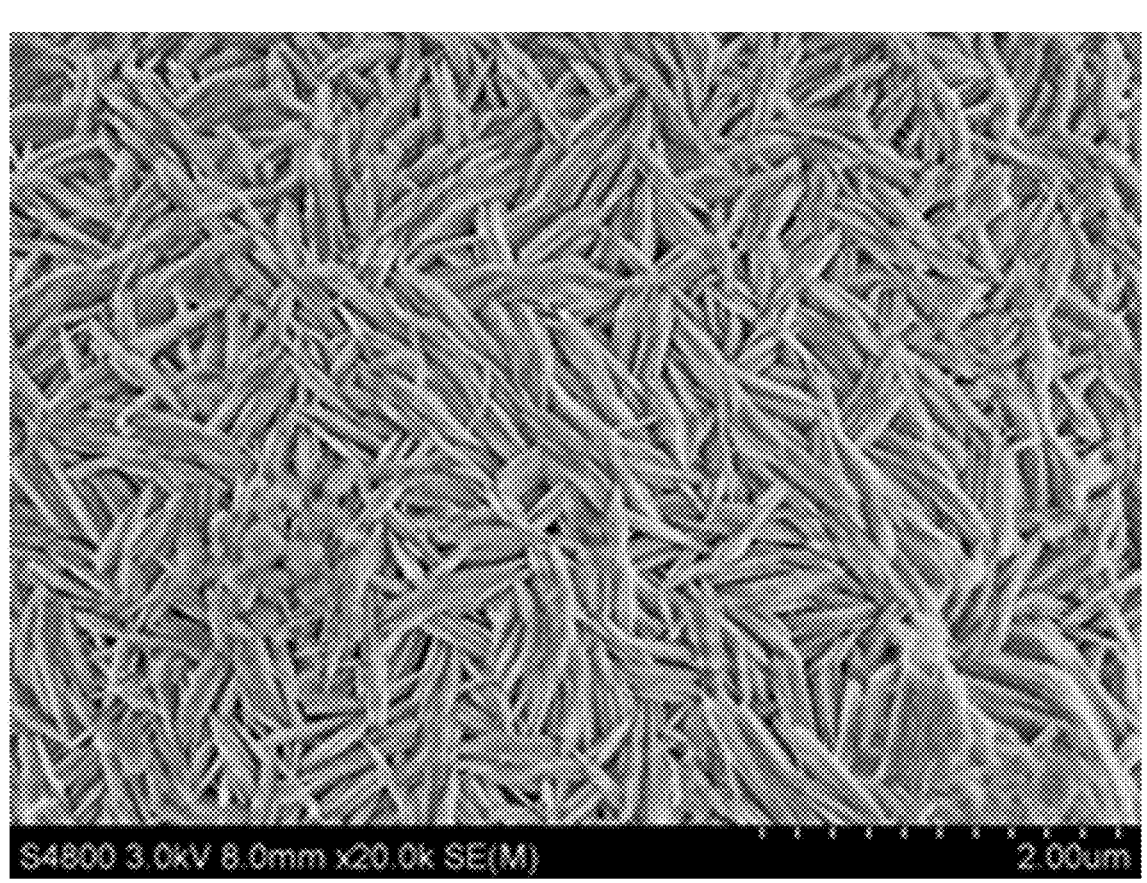
FIG. 4 is an SEM image of composite hydroxide particles used in Comparative Examples 4 to 6.

FIG. 3 is an SEM image of composite hydroxide particles used in Comparative Examples 1 to 3. FIG. 4 is an SEM image of composite hydroxide particles used in Comparative Examples 4 to 6.

Referring to FIGS. 3 and 4, it was confirmed that the primary precursor particles of Comparative Examples were needle-shaped. The aspect ratio of the needle-shaped particles was calculated as a ratio of a length of a minor axis (the shortest axis within the particle) to a length of a major axis (the longest axis within the particle). It was confirmed that the composite hydroxide particles of Comparative Examples had a remarkably large specific surface area.

Figure 5:
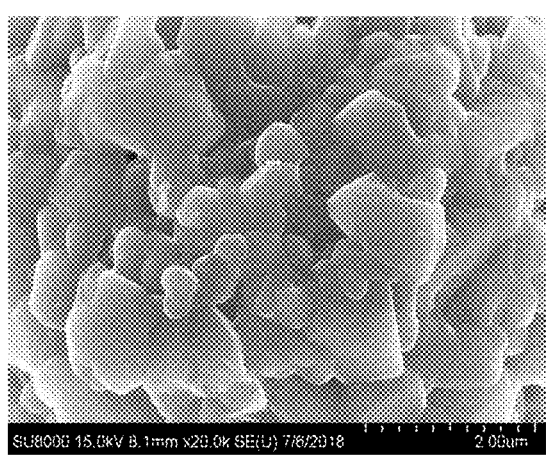
FIG. 5 is an SEM image of a preliminary lithium composite oxide particle formed from composite hydroxide particles of Example 1.
Figure 6:
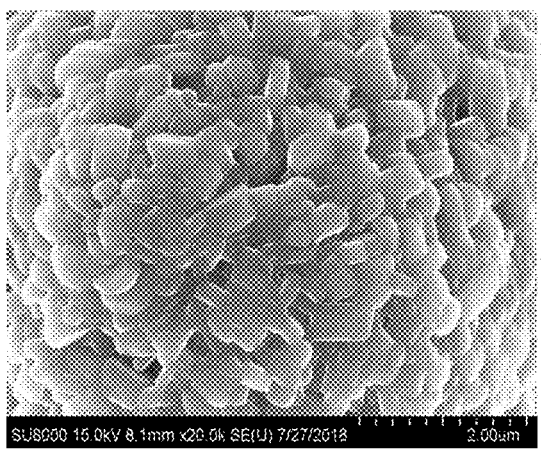
FIGS. 6 and 7 are SEM images of preliminary lithium composite oxide particles formed from composite hydroxide particles of Comparative Examples 1 and 4, respectively.
Figure 7:
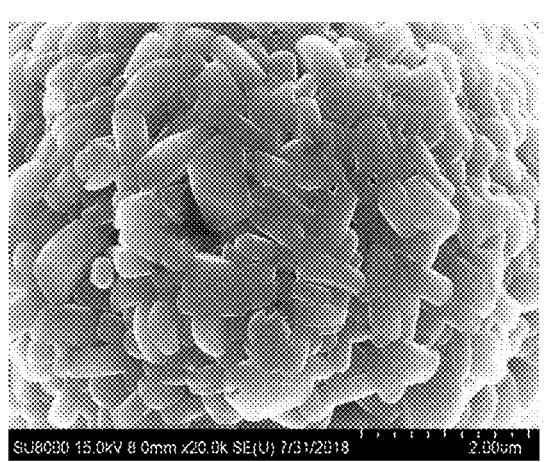

FIG. 5 is an SEM image of a preliminary lithium composite oxide particle formed from composite hydroxide particles of Example 1. FIGS. 6 and 7 are SEM images of primary fired particles formed from composite hydroxide particles of Comparative Examples 1 and 4, respectively.

Referring to FIGS. 5 to 7, surface shape and specific surface area of the cathode active material were changed depending on the surface shapes and specific surface areas of the composite hydroxide particles even when the first firing was performed under the same conditions (760° C., Li/M=1.06). The size and specific surface area of the primary particle of the composite hydroxide particle were substantially proportional to the size and specific surface area of the primary particle of the preliminary lithium composite oxide particle.

Figure 8:
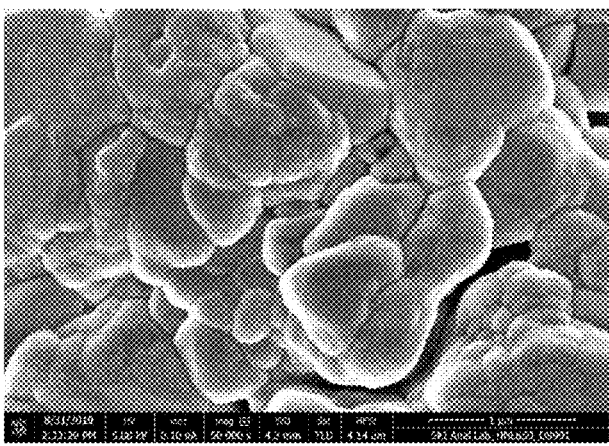
FIGS. 8 and 9 are SEM images of cathode active materials for a secondary batteries of Example 7 and Comparative Example 3, respectively.
Figure 9:
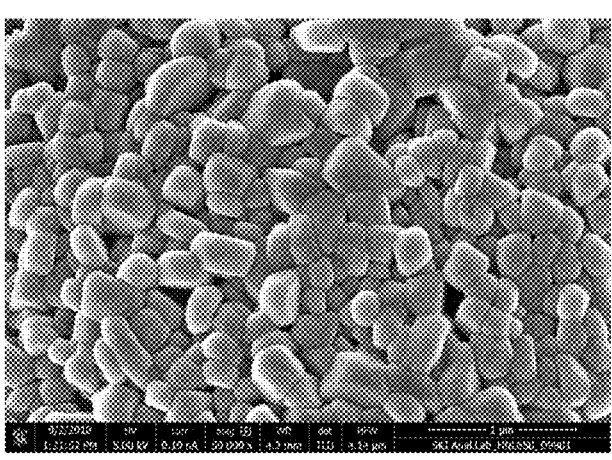
Figure 10:
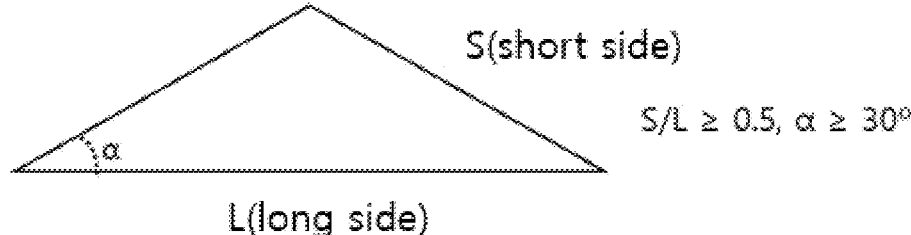
FIG. 10 is a schematic diagram illustrating a length ratio of a long side relative to a short side of a primary precursor particle.

FIGS. 8 and 9 are SEM images of cathode active materials for a secondary batteries of Example 7 and Comparative Example 3, respectively.

Referring to FIGS. 8 and 9, even though dimensions of the first firing and post-treatment processes became greater, the size and specific surface area of the primary particle of the composite hydroxide particle were substantially proportional to the size and specific surface area of the preliminary lithium composite oxide particle.

(2) Analysis on BET (Specific Surface Area)

BETs of the composite hydroxide particles and preliminary lithium composite oxide particles according to Examples and Comparative Examples were measured by a gas adsorption/desorption method using a BET measuring instrument (ASAP2420) of Micrometrics. The results are shown in Table 1 below.

The precursor A used in Examples 1 to 7 had a specific surface area of 1.0 $m^2/g$ or less, which was significantly smaller than those of Comparative Examples, and the specific surface area of the preliminary lithium composite oxide particle was also maintained as 0.12 $m^2/g$ or less.

TABLE 1

| | Precursor | | | Preliminary lithium composite oxide particle | | | |
|---|---|---|---|---|---|---|---|
| | | | Shape of primary | | | | |
| | Type | BET $(m^2/g)$ | particle (aspect ratio) | Firing Temperature | Li/M ratio | BET $(m^2/g)$ | Grain Shape |
| Example 1 | A | 0.89 | triangle | 760° C. | 1.06 | 0.111 | amorphous |
| Example 2 | | | (0.87) | 760° C. | 1.08 | 0.101 | |
| Example 3 | | | | 775° C. | 1.06 | 0.095 | |
| Example 4 | | | | 775° C. | 1.08 | 0.093 | |
| Example 5 | | | | 790° C. | 1.06 | 0.094 | |
| Example 6 | | | | 790° C. | 1.08 | 0.091 | |
| Example 7 | | | | 775° C. | 1.06 | 0.095 | |
| Comparative Example 1 | C | 9.80 | needle-shape (0.1 or less) | 760° C. | 1.06 | 0.141 | hexahedron |
| Comparative Example 2 | | | | 760° C. | 1.08 | 0.133 | |
| Comparative Example 3 | | | | 760° C. | 1.08 | 0.132 | |
| Comparative Example 4 | B | 6.81 | Needle-shape (0.05 or less) | 760° C. | 1.06 | 0.136 | hexahedron |
| Comparative Example 5 | | | | 775° C. | 1.06 | 0.129 | |
| Comparative Example 6 | | | | 790° C. | 1.06 | 0.122 | |

Experimental Example 2: Coin Cell Fabrication and Evaluation (1) Fabrication of Coin Half Cell Lithium metal oxide particles of Examples and Comparative Examples, a carbon black as a conductive agent, and a polyvinylidene fluoride (PVdF) as a binder were mixed in a weight ratio of 92:5:3 to prepare a slurry. The slurry was uniformly coated on an aluminum foil having a thickness of 15 μm, and vacuum dried at 130° C. to prepare a cathode. An electrode assembly was formed using the cathode, a lithium foil as a counter electrode and a porous polyethylene layer (thickness: 21 μm) as a separator.

A coin half cell was fabricated by a conventionally known manufacturing process using the electrode assembly and a liquid electrolyte including $LiPF_6$ dissolved with a concentration of 1.0M in a solvent in which ethylene carbonate and ethylmethyl carbonate were mixed in a volume ratio of 3:7, and evaluated at a voltage from 3.0V to 4.3V.

(2) Measurement of Initial Charge/Discharge Capacity

Initial charging and discharging capacities were measured by performing charging (CC/CV 0.1 C 4.3V 0.05 C CUT-OFF) and discharging (CC 0.1 C 3.0V CUT-OFF) once for the prepared battery cells (CC: constant current, CV: constant voltage).

(3) Measurement of Initial Efficiency

An initial efficiency was calculated as a percentage value obtained by dividing the initial discharge capacity by the initial charge capacity.

(4) Evaluation of Life-span at Room Temperature

Charging (CC/CV 0.5 C 4.3V 0.05 C CUT-OFF) and discharging (CC 1.0 C 3.0V CUT-OFF) for the battery cells according to Examples and Comparative Examples were repeated 300 times at 25° C. A capacity retention ratio was evaluated as a percentage value obtained by dividing the discharge capacity at the 300th cycle by the discharge capacity at the 1st cycle.

(5) Evaluation of Life-span at Room Temperature

Charging (CC/CV 0.33 C 4.3V 0.05 C CUT-OFF) and discharging (CC 0.33 C 3.0V CUT-OFF) for the battery cells according to Examples and Comparative Examples were repeated 100 times at 45° C. A capacity retention ratio was evaluated as a percentage value obtained by dividing the discharge capacity at the 100th cycle by the discharge capacity at the 1st cycle.

The results are shown in Table 2 below.

TABLE 2

| | Discharge Capacity (mAh/g) | Initial Efficiency (%) | Capacity Retention at room temperature (%) @300 cycle | Capacity Retention at high temperature (%) @100 cycle |
|---|---|---|---|---|
| Example 1 | 195 | 88.2 | 89 | 88 |
| Example 2 | 199 | 89.6 | 88 | 89 |
| Example 3 | 198 | 89.1 | 90 | 92 |
| Example 4 | 197 | 89.9 | 89 | 91 |
| Example 5 | 192 | 87.9 | 88 | 90 |
| Example 6 | 195 | 88.3 | 87 | 90 |
| Example 7 | 201 | 89.6 | 90 | 91 |
| Comparative Example 1 | 196 | 88.3 | 91 | 72 |
| Comparative Example 2 | 199 | 89.8 | 90 | 73 |
| Comparative Example 3 | 203 | 90.7 | 91 | 70 |
| Comparative Example 4 | 200 | 89.7 | 91 | 75 |
| Comparative Example 5 | 196 | 88.9 | 87 | 73 |
| Comparative Example 6 | 194 | 88.8 | 85 | 75 |

Referring to Table 2, the secondary batteries including the cathode active material formed from the precursors of Examples provided remarkably improved high-temperature life-span properties while maintaining substantially the same level of the capacity and room-temperature life-span properties as those of Comparative Examples.

Experimental Example 3: Fabrication and Evaluation of Lithium Secondary Battery (Full Cell)

(1) Fabrication of Lithium Secondary Battery (Full Cell)

The cathode electrode active materials prepared in Example 7 and Comparative Example 3, Denka Black as a conductive agent and a PVDF binder were mixed in a mass ratio of 92:5:3 to prepare a cathode mixture. The cathode mixture was coated on an aluminum substrate, dried and pressed to prepare a cathode.

An anode mixture containing 93 wt % of natural graphite ($d_{002}$: 3.358 Å) as an anode active material, 5 wt % of KS6 as a flake-type conductive agent, 1 wt % of SBR binder and 1 wt % of CMC thickener was coated on a copper substrate, dried and pressed to prepare an anode.

The cathode and the anode obtained as described above were notched with a proper size and stacked, and a separator (polyethylene, thickness: 25 μm) was interposed between the cathode and the anode to form an electrode cell. Each tab portion of the cathode and the anode was welded.

The welded cathode/separator/anode assembly was inserted in a pouch, and three sides of the pouch except for one side were sealed. The tab portions were also included in sealed portions. An electrolyte was injected through the one side except for the sealed portions, and then the one side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

Thereafter, pre-charging was performed for 36 minutes with a current (2.5 A) corresponding to 0.25 C. After 1 hour, degasing and aging for more than 24 hours were performed and then a charging and discharging for a formation was performed (charge condition CC-CV 0.2 C 4.2V 0.05 C CUT-OFF, discharge condition CC 0.2 C 2.5V CUT-OFF). Subsequently, a standard charging and discharging was performed (charge condition CC-CV 1.0 C 4.2V 0.05 C CUT-OFF, discharge condition CC 1.0 C 2.5V CUT-OFF).

(4) Evaluation of Life-span Property

Charging (CC-CV 1.0 C 4.15V 0.05 C CUT-OFF) and discharging (CC 1.0 C 3.1V CUT-OFF) for each secondary battery were repeated 2,000 times. A capacity retention ratio was evaluated as a percentage value obtained by dividing the discharge capacities at the 800th and 2,000th cycles by the discharge capacity at the 1st cycle.

(3) Evaluation of High Temperature Storage Property

Each of the prepared lithium secondary batteries was charged under the condition of CC-CV 1.0 C 4.2V 0.05 C CUT-OFF and stored in an oven at 60° C. for 8 weeks. Thereafter, the battery was discharged under the condition of CC 0.5 C 2.5V CUT-OFF, and then charged under the condition of CC-CV 0.5 C 4.2V 0.05 C CUT-OFF. Subsequently, a discharging capacity under the condition of CC 0.5 C 2.5V CUT-OFF was measured. A capacity retention ratio was calculated by comparing the discharge capacity with a discharge capacity during a standard charging and discharging. The results are shown in Table 3 below.

18

TABLE 3

| | Capacity Retention (%) at room temperature | | Capacity Retention (%) after high temperature storage | |
| --- | --- | --- | --- | --- |
| | 800th cycle | 2,000th cycle | 8 weeks | 12 weeks |
| Example 7 | 96% | 85% | 90% | 76% |
| Comparative Example 3 | 96% | 86% | 80% | 58% |

Referring to Table 2, the secondary batteries including the cathode active material formed from the precursors of Examples provided remarkably improved high-temperature life-span properties while maintaining substantially the same level of the capacity and room-temperature life-span properties as those of Comparative Examples.

What is claimed is:

1. A cathode active material precursor comprising a composite hydroxide particle in which primary precursor particles are aggregated, wherein the primary precursor particles include a particle having a triangular shape in which a minimum interior angle is 30° or more and a ratio of a length of a short side relative to a length of a long side is 0.5 or more, wherein the composite hydroxide particle has a specific surface area of 1.5 m²/g or less.

2. The cathode active material precursor of claim 1, the composite hydroxide particle includes an excess amount of nickel among metals included therein.

3. The cathode active material precursor of claim 2, wherein the composite hydroxide particle has a specific surface area of 1 m²/g or less.

4. The cathode active material precursor of claim 2, wherein a molar ratio of nickel in the metals included in the composite hydroxide particle is 0.8 or more.

5. The cathode active material precursor of claim 2, wherein the composite hydroxide particle further includes cobalt.

6. The cathode active material precursor of claim 5, wherein the composite hydroxide particle further includes manganese.

7. The cathode active material precursor of claim 1, wherein the composite hydroxide particle is represented by Chemical Formula 1:

$$Ni\alpha Co\beta M\gamma(OH)z \qquad \text{Chemical Formula 1}$$

wherein in Chemical Formula 1, M includes at least one selected from the group consisting of Mg, Sr, Ba, B, Al, Si, Mn, Ti, Zr and W, $0.8 \leq \alpha \leq 0.95$, $0 \leq \gamma/(\alpha+\beta) \leq 0.13$, $0 \leq \gamma \leq 0.11$ and $1.9 \leq z \leq 2.1$.

8. The cathode active material precursor of claim 1, wherein the ratio of the length of the short side relative to the length of the long side is 0.8 or more.

9. A cathode active material for a secondary battery, comprising a lithium composite oxide particle formed from the cathode active material precursor of claim 1.

10. The cathode active material for a secondary battery of claim 9, wherein the lithium composite oxide particle has an amorphous shape.

11. A lithium secondary battery, comprising:

a cathode comprising the cathode active material of claim 9; and an anode facing the cathode.

12. The cathode active material for a secondary battery of claim 9, wherein the lithium composite oxide particle has a secondary particle structure formed by aggregation of primary particles.

13. The cathode active material for a secondary battery of claim 12, wherein an average particle diameter (D50) of the primary particle in a volume-based cumulative distribution of a particle size is in a range from 0.5 μm to 1.2 μm.

14. The cathode active material for a secondary battery of claim 12, wherein an average particle diameter (D50) of the secondary particle in a volume-based cumulative distribution of a particle size is in a range from 9 μm to 12 μm.

\* \* \* \* \*